(12) United States Patent
Smithson

(10) Patent No.: US 9,364,096 B2
(45) Date of Patent: Jun. 14, 2016

(54) BED PAD WITH INSECT REPELLANT

(76) Inventor: Alan F. Smithson, Santa Ana, CA (US)

(*) Notice: Subject to any disclaimer, the term of this patent is extended or adjusted under 35 U.S.C. 154(b) by 921 days.

(21) Appl. No.: 13/290,317

(22) Filed: Nov. 7, 2011

(65) Prior Publication Data

US 2013/0111671 A1 May 9, 2013

(51) Int. Cl.
*A47C 17/00* (2006.01)
*A47C 27/12* (2006.01)
*A47C 31/00* (2006.01)
*A47G 9/00* (2006.01)

(52) U.S. Cl.
CPC .............. *A47C 27/122* (2013.01); *A47C 31/005* (2013.01); *A47C 31/007* (2013.01); *A47G 2009/001* (2013.01)

(58) Field of Classification Search
CPC .. A47C 27/122; A47C 31/005; A47C 31/007; A47G 2009/001
USPC ......... 5/413 R, 417, 420, 702, 724, 731, 737, 5/740, 652.1
See application file for complete search history.

(56) References Cited

U.S. PATENT DOCUMENTS

| | | | | |
|---|---|---|---|---|
| 5,220,884 A | * | 6/1993 | Townsend | 119/496 |
| 5,581,829 A | * | 12/1996 | Lee | 5/503.1 |
| 2003/0115670 A1 | * | 6/2003 | Antinoro | 5/420 |
| 2011/0311603 A1 | * | 12/2011 | Lucas | 424/411 |

* cited by examiner

*Primary Examiner* — David E Sosnowski
(74) *Attorney, Agent, or Firm* — Morland C. Fischer

(57) ABSTRACT

An insect-repelling bed pad to be located between the mattress and a box spring of a bed or laid upon the ground inside and out of doors for use by individuals and pets during sleep. The bed pad is manufactured from a porous or loosely-woven material (e.g., burlap) and includes a plurality of chambers. The chambers contain a natural (i.e., green) insect-repelling substance (e.g., cedar wood chips and/or dust) having a scent that is adapted to drive away insects without the use of chemicals. The scent and/or the dust is blown from the chambers of the bed pad to repel insects which may reside between the box spring and the mattress or around the bed site when a compressive force is applied by a user to the bed pad to correspondingly squeeze the chambers.

5 Claims, 5 Drawing Sheets

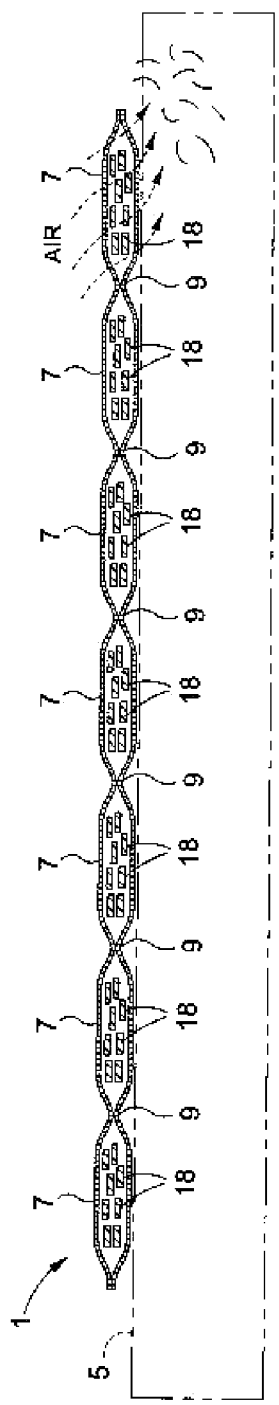
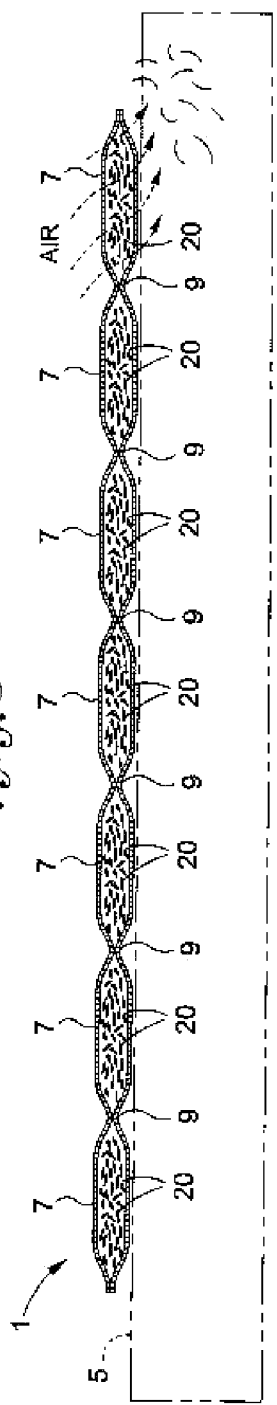
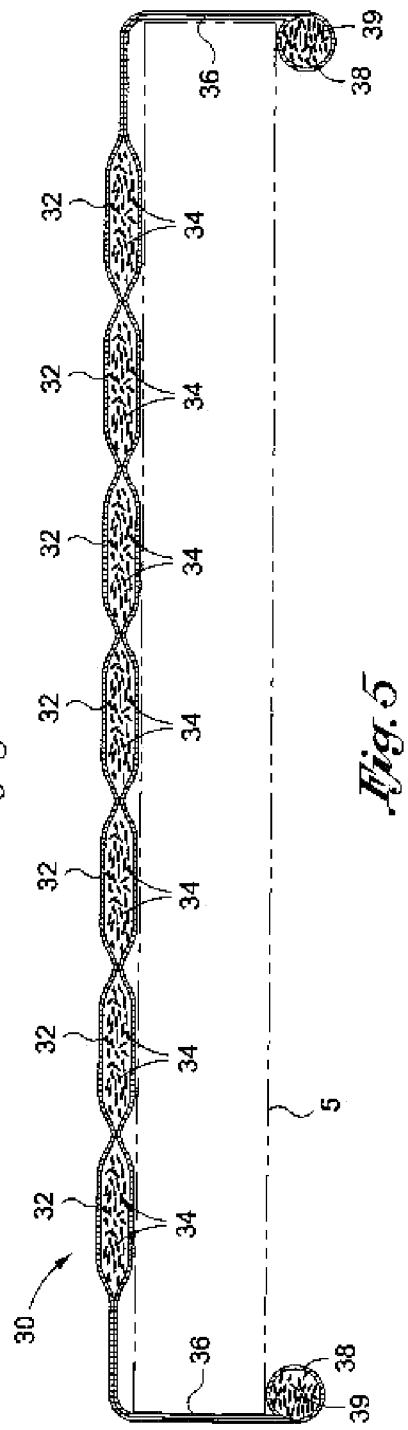
Fig. 3
Fig. 4
Fig. 5

BED PAD WITH INSECT REPELLANT

BACKGROUND OF THE INVENTION

1. Field of the Invention

This invention relates to a bed pad to be used both indoors (e.g., between a mattress and a box spring) or out of doors (e.g., laid on the ground) during sleep. The bed pad includes a plurality of porous chambers that are filled with a natural insect repellant that is adapted to repel insects without the use of chemicals or subjecting the user to a potentially hazardous environment.

2. Background Art

Insect infestation is a problem facing residents of apartments and houses in big cities and rural areas. For example, bed bugs have found their way into bedrooms and hidden themselves within the bedding. During the night, such bed bugs are known to bite unsuspecting individuals while at sleep drawing the individual's blood and leaving bite marks.

Common techniques for ridding an area of undesirable insects include spraying an insecticide, releasing a fog, and laying traps. In these cases, the insect-ridding means often contains toxic chemicals and/or a poison. Thus, one sleeping in an area that has been repeatedly treated over time may find himself in a potentially hazardous environment that could be especially inhospitable to small children and pets. In the case of bed bugs, an exterminator is sometimes summoned to use one of a variety of pesticides which tends to be expensive and may also expose the individual to an unhealthy environment while sleeping in his bedroom.

What is desirable is an alternative to the conventional use of bug killing chemicals, poisons and the toxicity associated therewith by a safe and natural (i.e., green) material which repels rather than kills insects and which is suitable for use on and around an individual's bed and bedding during sleep.

SUMMARY OF THE INVENTION

In general terms, a bed pad is disclosed that is adapted to repel (rather than kill) insects of the kind that are often found in the bedroom of a dwelling or at a campsite out of doors. The bed pad is suitable for use by both humans and pets to provide an insect-free bed site. In a preferred embodiment, the bed pad is laid flat between a mattress and a box spring of a typical bed. The bed pad includes a plurality of independent chambers. The bed paid is preferably manufactured from a porous or loosely-woven fiber material such as burlap, or the like. Each chamber is lined with a natural or "green" material which is known to repel insects. One example of a suitable insect repellant to fill the chambers of the bed pad is cedar wood which emits a scent or aroma (i.e., a fumigant) to drive away insects. Either cedar chips, cedar dust or a mixture of the chips and dust can be used to fill the chambers.

With one lying upon and/or rolling over top the bed pad, a compressive or squeezing force is applied so that air will be forced through the porous chambers. Accordingly, the scent of the cedar wood will fumigate the interface between the mattress and the box spring. At the same time, a compression of the bed pad will also cause some of the cedar dust to be expelled from the chambers for receipt between the mattress and the box spring. The bed pad may have extensions which overhang the box spring so that the cedar dust will also be deposited around the bed. Thus, insects will be repelled from the bed site without having to use toxic chemicals or subjecting the user to a potentially hazardous environment during sleep.

BRIEF DESCRIPTION OF THE DRAWINGS

FIG. 3 is a cross-section taken along lines 3-3 of FIG. 2 showing a plurality of chambers of the bed pad filled with an insect repellant;

FIG. 4 is a cross-section of the bed pad of FIG. 3 with the chambers filled with an alternate form of the insect repellant;

FIG. 5 is a cross-section of a bed pad having a plurality of chambers filled with an insect repellant according to another embodiment of this invention;

DESCRIPTION OF THE PREFERRED EMBODIMENT

Figure 1:
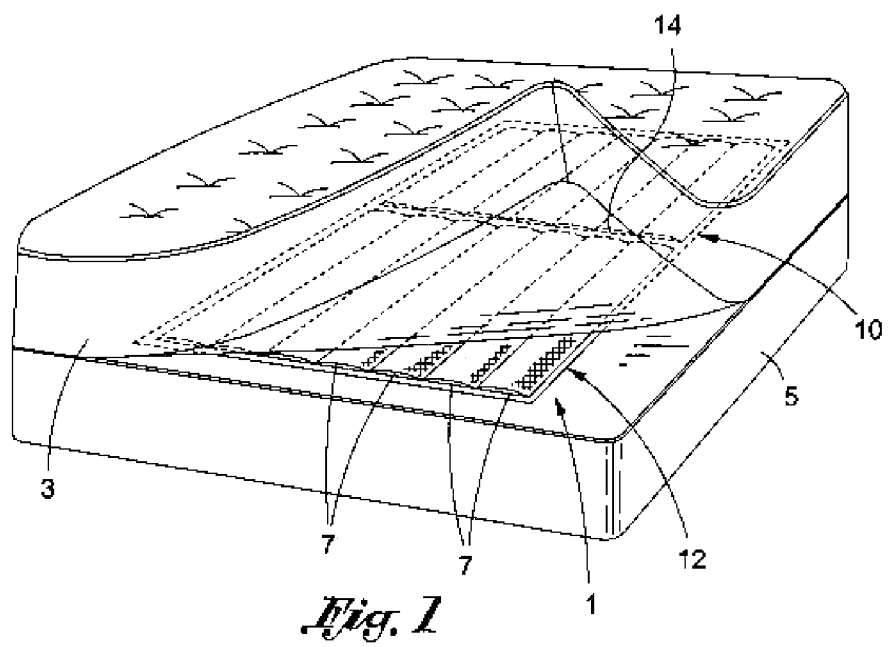
FIG. 1 shows a bed pad with insect repellant according to a preferred embodiment of this invention laying flat between a mattress and a box spring of a typical bed.

The bed pad 1 according to a preferred embodiment of this invention is initially described while referring concurrently to FIGS. 1-4 of the drawings. As will be explained, the bed pad 1 is adapted to repel insects of the kind often found in the bedroom of a dwelling or at a campsite out of doors. As is best shown in FIG. 1, the bed pad 1 is sized and shaped to be laid flat between a mattress 3 and a box spring 5 common to a bed. By virtue of the foregoing, one sleeping on the mattress 3 will be better able to avoid encountering insects (e.g., bed bugs and the like) that are known to reside in the bed, such as between the mattress 3 and box spring 5, or that may occupy other areas of the bed and bedding during the night.

Figure 8:
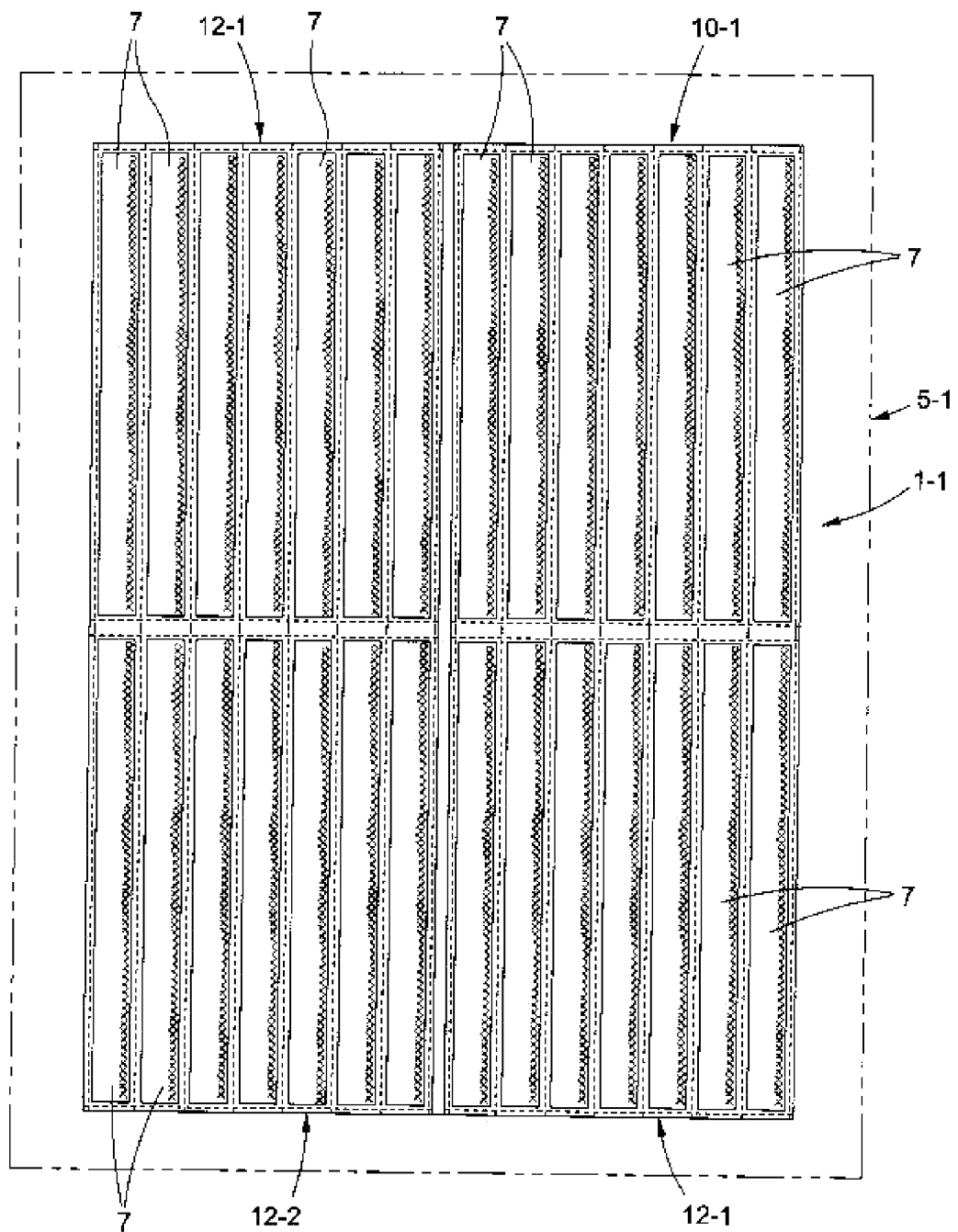
FIG. 8 shows a bed pad with insect repellant according to yet another embodiment of this invention.

The bed pad 1 has a flat rectangular body that is sized to fit comfortably and unobtrusively between the mattress 3 and the box spring 5. In the example of FIG. 1, the bed pad 1 is ideally 80 inches long and 30 inches wide. However, as shown in FIGS. 2 and 8, the dimensions of the bed pad 1 can vary from one application to the next.

Figure 2:
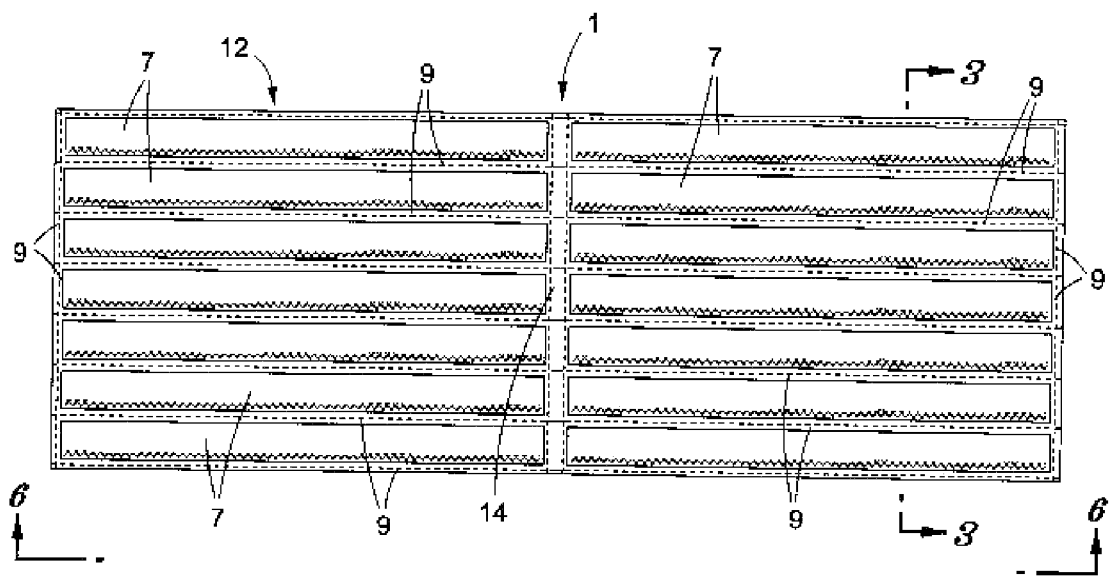
FIG. 2 is a top view of the bed pad with insect repellant of FIG. 1.

As is best shown in FIGS. 2-4, the bed pad 1 is manufactured with a plurality of chambers 7. The chambers 7 are preferably independent of one another. That is, each chamber 7 is closed by means of stitching 9 around the opposite ends and sides thereof so that the contents of the individual chambers will not migrate and accumulate and thereby result in an uneven distribution across the bed pad. As is best shown in FIG. 2, the bed pad 1 has an upper set 10 of chambers located above and spaced from a lower set 12 of chambers. The number of bed pad chambers 7 can vary depending upon the application of the bed pad 1.

Figure 6:
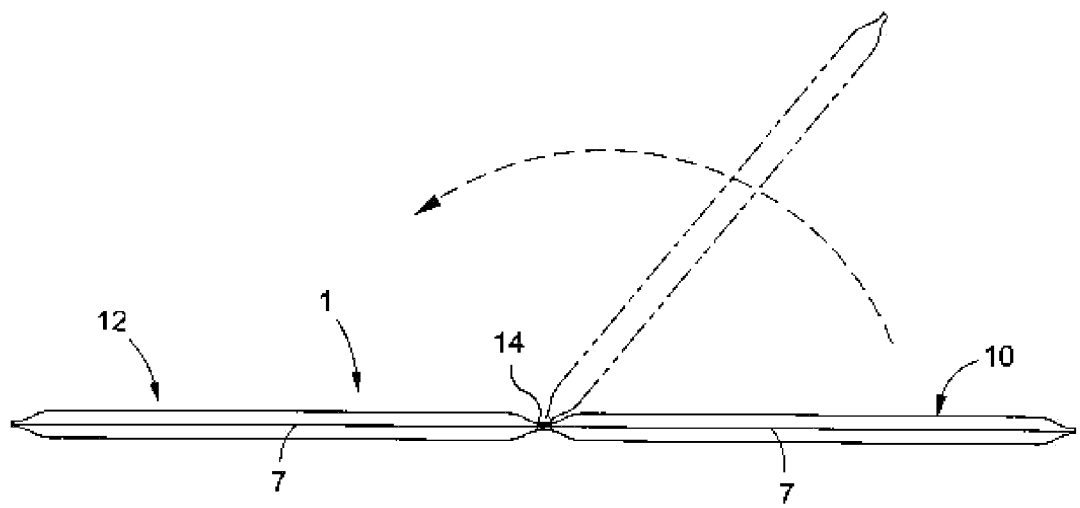
FIG. 6 shows the bed pad with insect repellant of FIG. 2 folded over itself.
Figure 7:
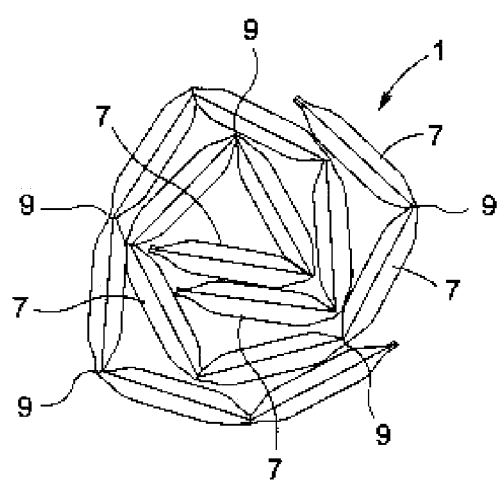
FIG. 7 shows the bed pad with insect repellant of FIG. 2 rolled up upon itself.

A flat and relatively narrow (with respect to the chambers) midsection 14 extends laterally across the bed pad 1 to create a fold line between the upper and lower sets 10 and 12 of bed pad chambers 7. The stitching 9 between the individual chambers 7 forms relatively narrow seams to enable the bed pad 1 to be folded over itself at the midsection 14 so that the upper set 10 of chambers will lie over top and face the lower set 12 as shown in FIG. 6 to facilitate transport and storage. In this same regard, the bed pad 1 can be rolled up upon itself as shown in FIG. 7 and folded at the seams created by the stitching 9.

As an important detail of this invention, the bed pad 1 and the chambers 7 thereof are manufactured from a porous or loosely-woven fiber material. By way of example, jute is a suitable fiber that can be woven into burlap or the like in order to manufacture the bed pad 1. As another important detail, prior to being stitched closed, each of the chambers 7 of bed pad 1 is filled with a material which is known to repel insects. It is preferable that the insect repelling material be a natural or "green" insect repellant so as to avoid subjecting the user to chemicals and a possibly toxic sleeping environment.

In particular, one example of a suitable natural insect repellant with which to fill the chambers 7 of the bed pad 1 is cedar wood. Cedar is known to have a characteristic aroma (i.e., a fumigant) which is capable of driving away insects. Eucalyptus is another example of a natural insect repellant that has an aroma which is capable of driving away certain insects. As shown in FIG. 3, the chambers 7 are filled with cedar chips 18. As shown in FIG. 4, the chambers 7 are filled with cedar (saw) dust 20 or larger sized particles. It is also within the scope of this invention for some of the chambers to be filled with the chips 18 and for other chambers to be filled with the dust 20. In addition, the chambers 7 can be filled with a mixture of the chips 18 and the dust 20.

With the bed pad 1 located between the mattress 3 and the box spring 5 in the manner shown in FIG. 1 and one sitting, lying on and/or rolling over the mattress, a compressive or squeezing force is applied to the bed pad. Accordingly, air will be forced through the porous chambers 7 of the bed pad 1. In the case of FIG. 3, the aroma or scent of the cedar chips 18 is blown from the chambers 7 to fumigate the interface between the mattress 3 and the box spring 5. In the case of FIG. 4, the compression of the bed pad 1 will blow some of the cedar dust 20 from the porous chambers 7 to line the interface between the mattress 3 and the box spring 5. In other words, the interface will be dusted with the cedar dust 20, whereby to treat the bed without subjecting the user to a potentially hazardous environment during sleep.

FIG. 5 of the drawings shows a modified bed pad 30 with an insect repellant like that carried by the bed pad 1 of FIGS. 1-4. Also like the bed pad 1, the bed pad 30 includes a plurality of chambers 32. The bed pad 30 is manufactured from a porous or loosely-woven fiber material, and the chambers 32 are filled with a natural insect repellant. The insect repellant can be (e.g., cedar) wood chips, (cedar) dust 34 (as shown), or a combination of chips and dust.

As was earlier explained when referring to FIGS. 1-4, a compression of the bed pad 30 causes an insect-repelling aroma and/or dust to be blown from the porous chambers 32 to the interface between mattress and box spring of a bed. The bed pad 30 of FIG. 5 provides the additional advantage that the insect repellant is also deposited below the box spring 5 so that the bed will be surrounded with insect repellant.

More particularly, flat, flexible extensions 36 depend outwardly from the opposite ends of the bed pad 30. A porous or loosely-woven compartment 38 is located at the end of each extension 36. The extensions 36 need be of sufficient length so that the compartments 38 at the ends thereof will reach below the bottom of the box spring 5. The compartments 38 can simply hang down below the box spring or be detachably connected to the underside of the box spring, as shown. A conventional fastener (not shown), such as the hook and loop material known commercially as Velcro, can be used to hold the compartments 38 against the bottom of the box spring 5.

The compartments 38 are filled with a natural insect repellant 39 as earlier described, such as (e.g., cedar) chips, dust or a combination thereof. Depending upon whether the box spring 5 shown in FIG. 5 is seated upon a bed frame or laid upon the ground, an insect-repelling fumigant and/or dust will exit the porous compartments 38 of the bed pad 30 to treat the underside of the box spring 5 and the area (if any) between the underside of the box spring and the ground. Once again, the foregoing will be accomplished without the use of toxic chemicals or subjecting the user to pesticides or a potentially hazardous environment when sleeping.

FIG. 8 of the drawings shows a bed pad 1-1 which is a variation or the bed pad 1 of FIGS. 1-4. While the bed pad 1 has a single upper set 10 of insect repellant-filled chambers 7 and a single lower set 12 of insect repellant-filled chambers 7, the bed pad 1-1 of FIG. S has a pair of upper sets 10-1 and 10-2 of chambers 7 and a pair of lower sets 12-1 and 12-2 of chambers. The pairs of upper and lower sets 10-1, 10-2 and 12-1, 12-2 of chambers are sewn together to lie one above the other and side-by-side so as to create a relatively large pad to lay upon a correspondingly large box spring 5-1. in this same regard, the bed pad 1-1 of FIG. 8 can ideally accommodate more than a single person.

Figure 9:
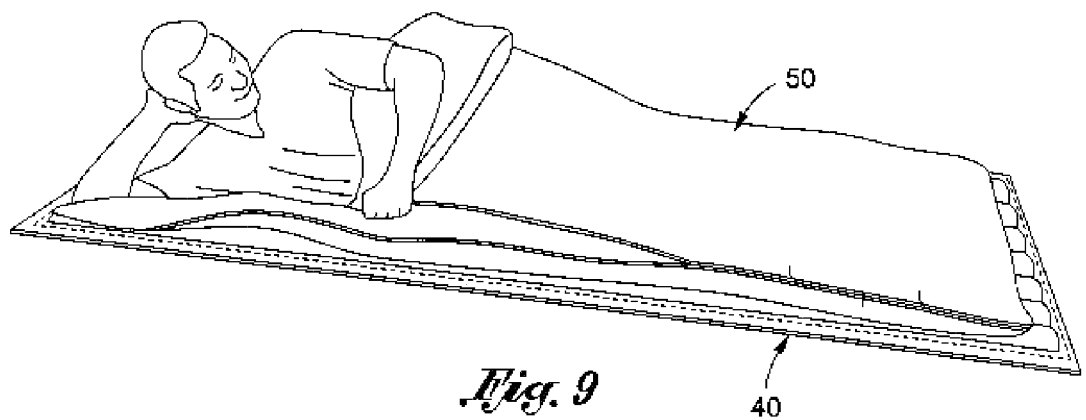
FIGS. 9 and 10 show applications of the bed pad with insect repellant for use by humans and pets both inside and out of doors.
Figure 10:
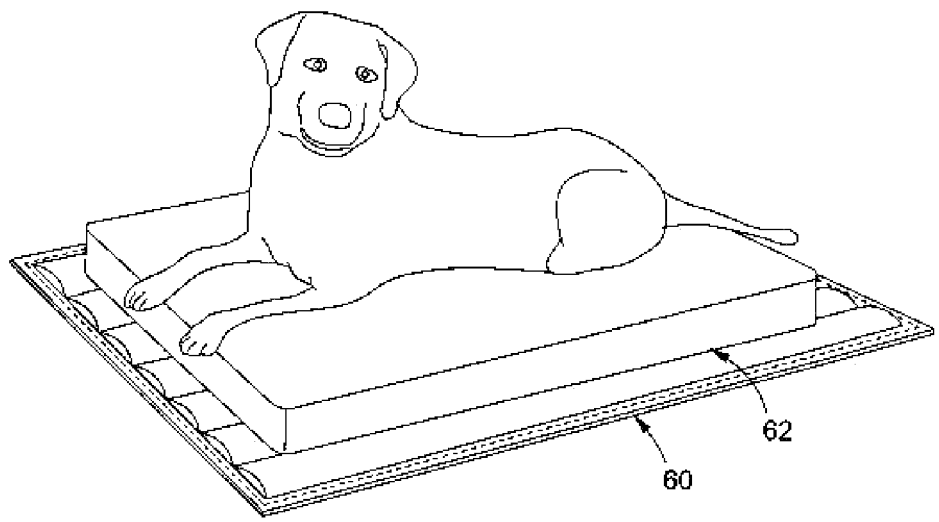

FIGS. 9 and 10 of the drawings show additional applications for the bed pad 1 of this invention. By way of a first example, a bed pad 40 of FIG. 9 is laid upon the ground at a campsite such as while an individual is sleeping out of doors. The individual can surround himself with a sleeping bag 50 which is laid over top the bed pad 40 during sleep. The bed pad 40 includes a plurality of porous or loosely-woven chambers like those designated 7 in FIGS. 1-3 that are filled with a natural insect repellant in the manner previously disclosed. As the individual sits or lies on and/or rolls over the bed pad 40, an insect-repelling fumigant and/or dust will be blown below and around the bed pad to treat the individual's bed site without having to use potentially harmful chemicals.

In FIG. 10, a bed pad 60 is used as bedding for a pet (e.g., a dog). The bed pad 60 is laid on the floor indoors or on the ground outside. A cushion 62 is laid over the top of the bed pad 60 on which the pet can rest or sleep. The bed pad 60 includes a plurality of porous or loosely-woven chambers that are filled with a natural insect repellant in the same manner that was disclosed while referring to FIGS. 1-3. As the pet lies on and rolls over the cushion 62, an insect-repelling fumigant and/or dust will be blown below and around the bed pad 60 to treat the pet's bed site without the use of chemicals.

Although a bed pad has been described above, it is to be understood that the size of the pad can vary so as to be used with other articles of furniture, such as a chair or sofa. For example, in the case of a sofa, the inset-repelling pad herein disclosed may be placed below the seat cushions so as to be compressed and fumigate the area between the seat cushions and the cushion base whenever a user sits upon the cushions.

The invention claimed is:

1. A bed having a box spring, a mattress positioned above the box spring, and an insect-repelling bed pad located between the box spring and the mattress, said bed pad being manufactured from a porous material having at least one chamber within which an insect-repelling substance is contained, said bed pad being responsive to a compressive force applied thereto when a user lies on the mattress for correspondingly causing said chamber to be squeezed and some of the insect-repelling substance to be blown from said chamber and through the porous material of said bed pad, said insect repelling substance that is contained by said at least one chamber including particles that are sized to pass from said chamber and through the porous material of said bed pad, said porous material having spaces formed therein that are sized to accommodate the passage of the particles of said insect repelling substance from the inside of said chamber to the outside of said bed pad when said bed pad is compressed and said chamber is correspondingly squeezed so that said particles are blown through said spaces and deposited at the interface between the box spring and the mattress at which said bed pad is located, the particles of said insect repelling substance having a scent that is adapted to drive away insects, said bed pad having first and opposite ends, a flexible extension depending from each of said first and opposite ends, and a porous compartment attached to each flexible extension and containing an insect-repelling substance, each flexible extension having a length such that the porous compartment attached thereto is located below the box spring at which to deposit some of the particles of the insect-repelling substance.

2. The bed recited in claim 1, wherein said insect-repelling substance contained by said at least one chamber of said bed pad has no chemicals and is made from ingredients found in nature.

3. The bed recited in claim 2, wherein said insect-repelling substance contained by said at least one chamber of said bed pad includes a naturally scented wood.

4. The bed recited in claim 3, wherein said naturally-scented wood is cedar.

5. The bed recited in claim 1, wherein said bed pad has a plurality of chambers each of which containing an insect-repelling substance that includes particles having a scent which is adapted to drive away insects, said particles being blown from the inside of at least some of said plurality of chambers and through the spaces of the porous material to the outside of said bed pad when said bed pad is compressed and said plurality of chambers are correspondingly squeezed.

* * * * *